UNITED STATES PATENT OFFICE.

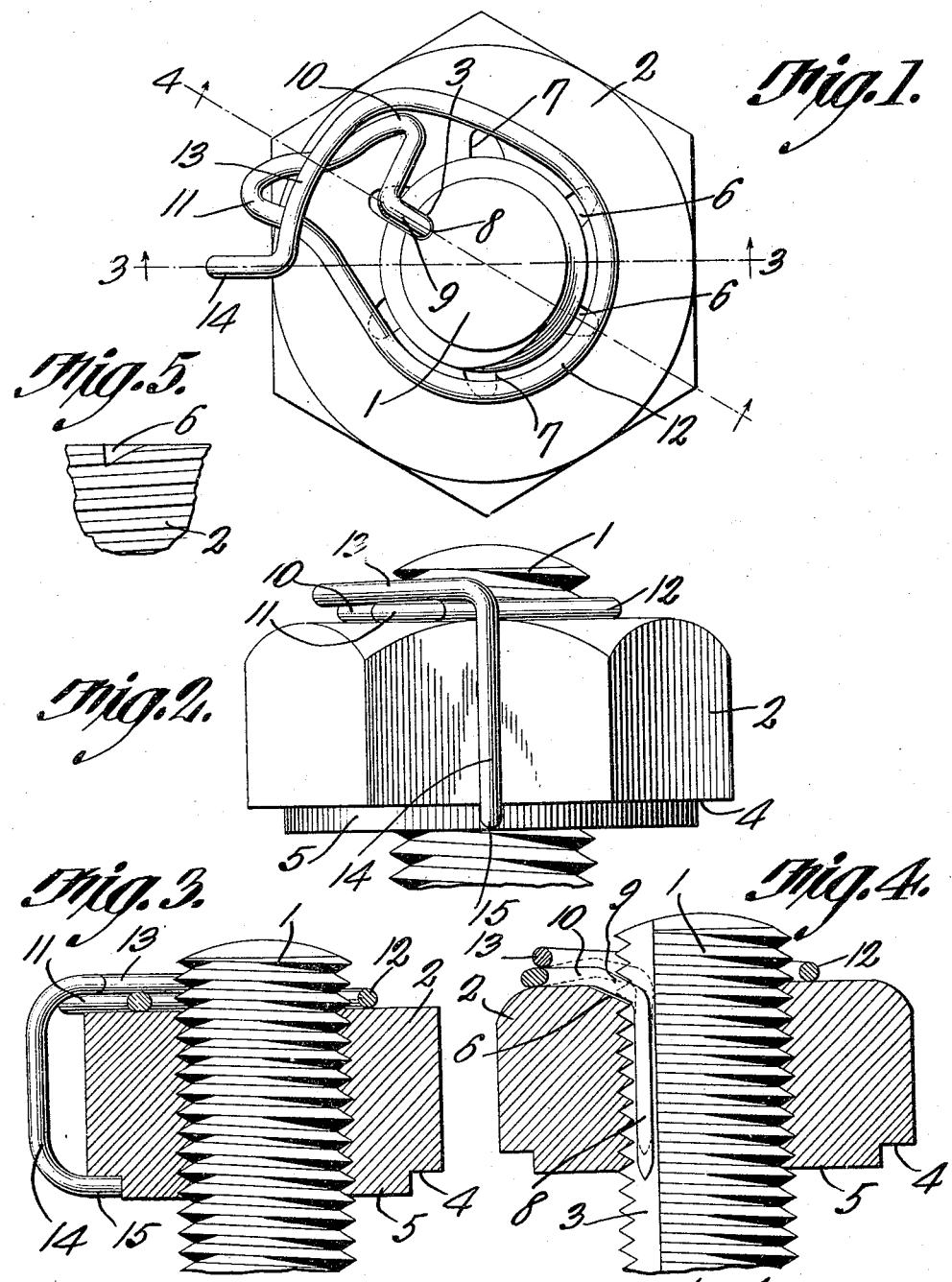

ALVIN C. STOPP, OF STOPPINGTON, ALBERTA, CANADA.

NUT-LOCK.

1,122,331.   Specification of Letters Patent.   Patented Dec. 29, 1914.

Application filed October 29, 1913. Serial No. 798,143.

*To all whom it may concern:*

Be it known that I, ALVIN C. STOPP, a citizen of the United States, residing at Stoppington, in the Province of Alberta and Dominion of Canada, have invented a new and useful Nut-Lock, of which the following is a specification.

The present invention appertains to nut locks, and aims to provide a novel and improved device of that character.

One of the objects of the present invention is to provide a unique device applicable to a bolt and nut threaded thereon, to lock the nut against retrograde movement in a peculiar and efficient manner.

Another object of the present invention is to provide a device of the nature indicated, which will permit the nut to be tightened upon the bolt, but which will lock the nut against retrograde or outward movement.

A further object of the present invention is to provide a device of the character specified, which will be comparatively simple, durable and inexpensive in construction, which may be readily manufactured from wire stock, and which will be simple, convenient and efficient in its use.

With the foregoing general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiments in the accompanying drawing, wherein:—

Figure 1 is an end view of a bolt having a nut threaded thereon, with the locking device applied to the nut and bolt, the face of the nut being shown. Fig. 2 is a side elevation of the parts depicted in Fig. 1, a portion of the bolt being broken away. Figs. 3 and 4 are sectional views taken on the lines 3—3 and 4—4 of Fig. 1, respectively. Fig. 5 is a fragmental detail illustrating one of the ratchet notches of the nut.

In the drawing, the bolt has been designated by the numeral 1, the same being of any suitable type, and the nut threaded upon the bolt has been designated by the numeral 2, the nut being illustrated as hexagonal, although it may be of any other contour.

In carrying out the present invention, the bolt 1 is provided with a longitudinal groove or channel 3, which may be extended spirally along the bolt, if desired. The back or base of the nut 2 is provided with a marginal rabbet 4 providing the circular boss 5, while the face of the nut is provided with a series of ratchet notches 6 about the threaded bore. The notches 6 may be of any suitable number, according to the circumstances, and are provided with the shoulders 7, which face in the proper direction according to the thread of the bolt. As illustrated, the bolt and nut are provided with a left hand thread, although a right hand thread is preferably employed, the position of the several parts being reversed when a right hand thread is employed.

The locking device is bent from a length of suitable wire stock, which possesses the requisite rigidity and resiliency to carry out the results desired. One end portion of the wire forms a key 8 adapted to enter the groove or channel 3 of the bolt, and from the base or butt end of the key, the wire is bent angularly, as at 9, to provide a dog or pawl engageable with the notches 6. From the pawl or dog 9, the wire is bent into a V-shaped spring 10, and from the spring 10, the wire is bent into an outwardly projecting loop or bend 11. From the loop 11, the wire is bent into a loop 12 adapted to loosely encompass or surround the bolt, the outer or free end portion of the loop 12 passing over or crossing the loop or bend 11, as at 13. The spring 10 and loop 11, as well as the intermediate portion of the loop 12, are adapted to rest against the face of the nut, and from the outer or free end 13 of the loop 12, the wire is bent into an angular curved or bowed retaining finger 14, the tip or free end 15 of which is engageable in the rabbet 4, to rest against the boss 5. The retaining finger 14 constitutes the other end portion of the wire from which the locking device is formed.

When the retaining or locking device has been applied to the nut and bolt, as above indicated, and as clearly illustrated in the drawing, the spring 10 will yieldingly hold the pawl or dog 9 in engagement with the respective shoulder 7, and the key 8 of the pawl or dog 9 engaging the groove of the bolt, will lock the nut against rotation in such a direction as to permit the nut to be removed. It is to be noted that the retaining finger 14 holds the loop or bend 11 against the face of the nut, and therefore holds the spring 10 in position, the spring 10 having a tension tending to force the pawl or dog 9 and the key 8 inwardly, but permitting the pawl or dog to yield when the nut is tightened or screwed inwardly along the bolt. Thus, when the nut is tightened, the spring 10 will permit the pawl or dog 9 to yield so as to pass over the successive shoulders 7, and snap in back of the same to prevent the retrograde movement of the nut.

The present locking device may be applied to the nut and bolt either prior to the rotation of the nut to proper position, or after the nut has been rotated to its proper position, as will be apparent. With the present device, the nut is devoid of internal grooves, which would mutilate the threads of the nut, it merely being necessary to provide the notches 6 in the face of the nut, in connection with the rabbet 4. The rabbet 4 permits the nut to rotate, without tending to rotate or swing the retaining finger 14 therewith, it being observed that the present device remains stationary with respect to the bolt while the nut is free to be rotated or turned. Thus, as the nut is threaded or run upon the bolt, the locking device will move longitudinally therewith.

Having thus described the invention what is claimed as new is:—

1. A nut lock bent from a wire, the end portions of which form a key, and a retaining finger, the wire being bent from the butt end of the key to provide a pawl, and then being bent to provide a spring attached to the butt end of the retaining finger.

2. A nut lock bent from a wire, one end portion of which provides a key, the wire being bent angularly from the butt end of the key to provide a pawl, the wire then being bent into a spring and an outwardly projecting bend, then being bent into a loop having its free end crossing the said bend, and then being bent to form a retaining finger.

3. The combination with a grooved bolt, and a nut threaded thereon having a ratchet upon its face, of a locking device embodying retaining means engaging the outside of the nut, a key engaging the groove of the bolt, a pawl at the butt end of the key engageable with the ratchet, and a loop portion connecting the retaining means and pawl and surrounding the bolt.

4. The combination with a grooved bolt, and a nut threaded thereon having a marginal rabbet and having a ratchet upon its face adjoining the threaded bore, of a locking device bent from a wire, one end portion of the wire forming a key engaging the groove of the bolt, the wire being bent from the butt end of the key to provide a pawl engageable with the ratchet, the wire then being bent to form a spring seating against the face of the nut, and then being bent into a retaining finger engaging the rabbet to maintain the spring in position against the face of the nut.

5. The combination with a grooved bolt, and a nut threaded thereon having a marginal rabbet and having a facial ratchet adjoining its threaded bore, of a locking device bent from a wire, one end portion of the wire forming a key engaging the groove of the bolt, the wire being bent angularly from the butt end of the key to form a pawl engageable with the ratchet, the wire then being bent into a spring and an outstanding bend seating against the face of the nut, then being bent into a loop embracing the bolt and crossing the said bend, and then being bent into a finger having its tip engaging the said rabbet.

6. A nut lock embodying a key, a pawl attached to the butt end of the key, a loop portion, a spring portion connecting the loop portion and pawl, and retaining means attached to the loop portion.

7. The combination with a grooved bolt, and a nut threaded thereon having a facial ratchet, of a locking device embodying a key engaging the groove of the bolt, a pawl attached to the butt end of the key and cooperable with the ratchet, a loop portion surrounding the bolt, a retaining finger engaging the outside of the nut and having its butt end attached to the said loop portion, and a spring portion connecting the said loop portion and pawl.

In testimony that I claim the foregoing as my own, I have hereto affixed my signature in the presence of two witnesses.

ALVIN C. STOPP.

Witnesses:
W. C. ROBINSON,
LOUIS VOSBY.